INVENTORS
Charles C. McPheeters, Joseph C. McGuire,
Renato Tercovich
BY

March 14, 1967  C. C. McPHEETERS ET AL  3,309,233
SOLID ELECTROLYTE ELECTROCHEMICAL CELL
Filed Dec. 30, 1964  2 Sheets-Sheet 2

INVENTORS
Charles C. McPheeters, Joseph C. McGuire,
Renato Tercovich
BY
Roland A. Anderson
attorney

United States Patent Office 3,309,233
Patented Mar. 14, 1967

3,309,233
SOLID ELECTROLYTE ELECTROCHEMICAL CELL
Charles C. McPheeters, Los Alamos, Joseph C. McGuire, White Rock, and Renato Tercovich, Los Alamos, N. Mex., assignors to the United States of America as represented by the United States Atomic Energy Commission
Filed Dec. 30, 1964, Ser. No. 422,472
6 Claims. (Cl. 136—153)

This invention relates to electrochemical cells and, more particularly, to solid electrolyte galvanic cells.

In recent years liquid sodium has been employed as a nuclear reactant coolant. It has been found that the corrosion rates in sodium at elevated temperatures of many materials utilized in the construction of sodium cooled power reactors increase with increasing concentration of the oxygen dissolved in the sodium. Since the life and safety of such a reactor depend on the oxygen content of the coolant, it is desirable that it should be monitored continuously. The problem of monitoring continuously is intensified by the fact that an upper limit of as low as one to two parts per million can be tolerated when a reactive material such as zirconium or niobium is exposed to sodium at high temperatures.

A number of chemical methods have been developed to measure the oxygen content, but these methods are not continuous. An additional defect of these chemical methods is that there is a long lapse in time between the start of sampling and the receipt of analytical results.

Plugging meters have been used in the past, but this is not a continuous meter and below an oxygen concentration of ten parts per million the problem of measurement is aggravated by the fact that other properties of the metal than the temperature variation of the solubility of oxygen in sodium must be measured. Resistivity meters have been used and, although they continuously monitor, they respond to impurities in general and are not specific for oxygen. Solid electrolyte galvanic cells have been proposed for monitoring the activity of oxygen in hot trapped sodium coolant circuit. In such a system, the thermodynamic potential is measured rather than directly measuring the concentration of oxygen in the sodium.

Probably the most critical component of such an electrochemical cell is the solid electrolyte. This material must satisfy three main criteria. First, the material must conduct electricity primarily by ions rather than by electrons. Conduction by electrons lowers the voltage of the galvanic cell below that predicted from thermodynamic calculations. Very high electronic conduction such as found in semiconductors would eliminate the E.M.F. Secondly, the solid electrolyte must be fairly inert to hot sodium. A reactive layer would interfere with the operation of the electrochemical cell. Excessive corrosion would severely limit the life of the cell and thereby decrease its utility substantially. A third criterion is that the solid electrolyte must not be porous or the penetrating liquid sodium would short out the circuit.

Calcia stabilized zirconia has been used as a solid electrolyte. This material satisfies the above criteria fairly well, but it has been found that at higher temperatures (e.g., about 370 to 400° C.) zirconia is reduced by the sodium and its effectiveness as a solid electrolyte in such a cell is destroyed.

The invention herein resides in the use of yttria as the sodium electrolyte of an electrochemical cell. This material is useful in the 400 to 500° C. temperature range which is a normal reactor temperature range. The utility of yttria in this application is somewhat unexpected owing to the fact that yttria is generally regarded a sa semiconductor material and might be expected to permit excessive electronic conduction.

It is, accordingly, an object of this invention to provide a solid electrolyte material useful in an electrochemical cell which can continuously monitor the concentration of dissolved oxygen in sodium.

It is a further object of this invention to provide an electrochemical cell for continuously monitoring the oxygen content in sodium reactor coolant.

The above and other objects and features of the invention will be made fully apparent to those skilled in the art from a consideration of the following detailed description taken in conjunction with the accompanying drawings wherein.

Figure 1:
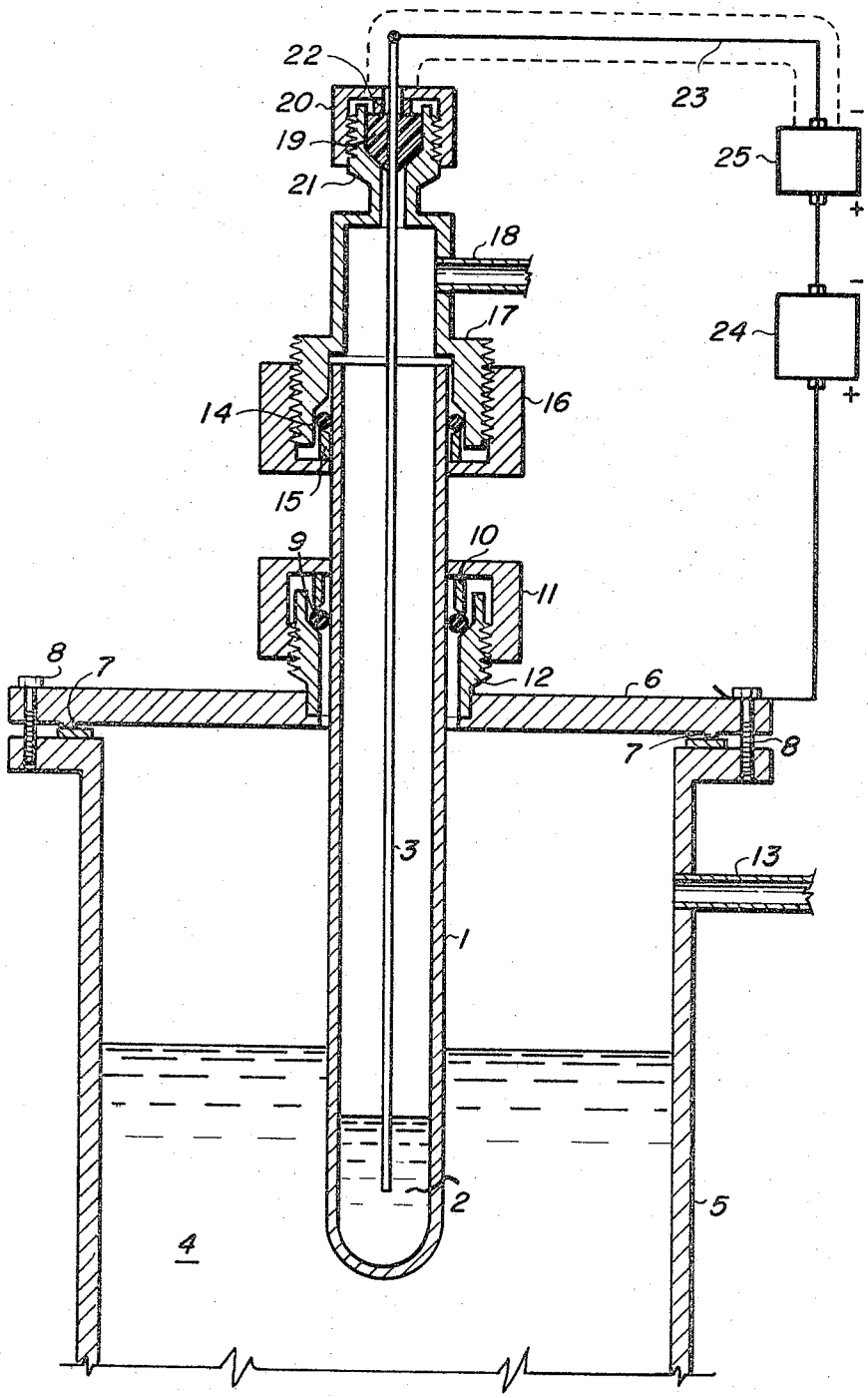
FIGURE 1 is a cross-section of an electrochemical cell for continuously monitoring the oxygen content of sodium utilizing yttria as the solid electrolyte.

The particular electrochemical cell shown in FIGURE 1 is Na, $Na_2O(Na)$, saturated|$Y_2O_3$|Na, $Na_2O(Na)$, unsaturated, wherein the $Na_2O(Na)$ represents oxygen dissolved in sodium. The reference electrode is saturated with oxygen dissolved in sodium, whereas the other electrode is unsaturated with oxygen and the oxygen content is unknown. Although in the specific embodiment described hereinafter the reference electrode is composed of Na, $Na_2O(Na)$, metal-metal oxide mixtures in general are suitable (e.g., Ni-NiO, Fe-FeO, or $Cu-Cu_2O$). The half cell reactions are $Na_2O + 2e^- = 2Na + O^=$ and $$O^= + 2Na = Na_2O(Na) + 2e^-$$

The activity of the oxygen dissolved in the sodium of each electrode is a function of the temperature and the concentration of the dissolved oxygen. The concentration is related to the activity by the following equation:

$$[Na_2O(Na)] = \gamma C$$

where $\gamma$ is the activity coefficient and C is the concentration of dissolved oxygen. It is found that at very low concentrations (such as those of concern in reactor sodium coolant loops) the activity coefficient approaches a limiting value that is independent of concentration. Consequently, the approximation can be made that the activity coefficient for sodium oxide in unsaturated sodium is independent of concentration. From this and other considerations, the electric potential between the reference electrode and the sodium is theoretically given by the equation

$$E = E_O - 9.92 \times 10^{-5} T \log_{10} C/C_O$$

wherein $E_O$ is the standard potential of the cell in volts, T is the absolute temperatures in degrees Kelvin, C is the concentration of sodium oxide in sodium in the unsaturated electrode, and $C_O$ is the saturation concentration of sodium oxide in sodium. Since C is less than $C_O$, the logarithm of the ratio is negative and the smaller the concentration the larger will be the negative logarithmic term. Accordingly, the instrument increases in sensitivity as the concentration of sodium in the unsaturated sodium decreases.

Thimble 1 is the solid electrolyte and is ¾ inch in diameter, $1/16$ inch wall thickness, 18 inches long. The solid electrolyte of this invention is high purity yttria (less than 1/100% impurities). Sodium saturated with oxide is placed at 2. Additional sodium oxide is added to this saturated sodium in order to replace the oxygen lost by diffusion through the solid electrolyte 1 during operation. Stainless steel rod 3 is partially immersed in the saturated sodium. Thimble 1 is partially immersed in sodium pool 4 which contains an unknown quantity of dissolved oxygen. For purposes of testing, sodium pool 4 would be connected to a cold trap so that the oxygen concentration in sodium pool 4 may be known by independent means (i.e., the known cold trap temperature will determine the oxygen concentration in sodium pool 4). When utilized with a reactor coolant loop, sodium pool 4 would be in direct connection with the coolant loop. Container 5 holds sodium pool 4 and is enclosed by container top 6. Container 5 is rendered airtight by ring seal 7 and bolts 8. Sealing is effected at the thimble by O-ring 9 and compression ring 10. Screwing nut 11 down on the ring 12 compresses ring 10 and forms a seal by O-ring 9. Tube 13 is a connection to vacuum and a helium supply. Since pool 4 must not be in contact with oxygen, container 5 is evacuated and refilled with helium before operation. Seepage of oxygen into the interior of thimble 1 is prevented by a similar arrangement. O-ring 14 is compressed by compression ring 15, compression ring in turn being compressed by screwing nut 16 onto piece 17. Tube 18 is a connection to vacuum and helium so that the space above the reference electrode 2 can be evacuated and refilled with helium. Teflon gland seal 19 also serves to prevent oxygen seepage into thimble 1. In addition, gland seal 19 electrically insulates stainless steel rod 3. Compression of gland seal 19 is obtained in a similar manner as that of O-ring 9 and 14, i.e., screwing nut 20 onto piece 21 transmits pressure through ring 22 to the gland seal. Stainless steel rod 3 serves as an electrical connection and electrical conductor 23 is shielded. Another electrical connection may be made at bolt 8 and bolt 8 and stainless steel rod 3 are in electrical connection through potentiometer 24 and electrometer 25. In operation, potentiometer 24 imposes a bucking voltage against electrometer 25 and when current ceases to flow the bucking voltage is equal to the E.M.F. produced by the electrochemical cell.

Figure 2:
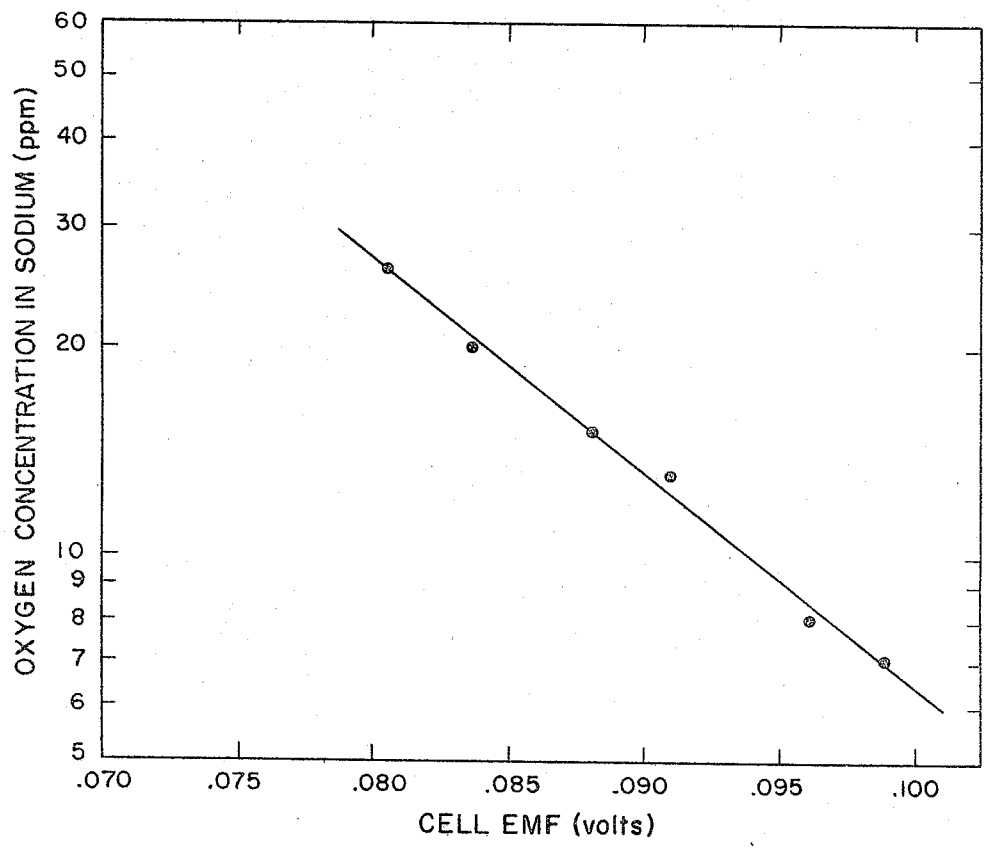
FIGURE 2 is a semi-log calibration curve showing the relationship between concentration and produced E.M.F. at a particular temperature (400° C.).

FIGURE 2 illustrates a calibration curve at 400° C. It consists of a plot of concentration versus developed E.M.F. A semilog scale was used since the E.M.F. is a function of the logarithm of concentration. FIGURE 2 makes evident a very important advantage of the solid electrolyte galvanic cell, i.e., the sensitivity of the device increases with decreasing concentration.

The device of the present invention utilizing a yttria electrolyte is useful in the temperature range of about 400 to 500° C., these temperatures being of interest in liquid sodium reactor cooling loops. Below 400° C., it seems that the diffusion of oxygen ions is quite slow and the response of the device is too sluggish for practical use. At about 500° C. the yttria electrolyte permits excessive electronic conduction resulting in a drastic falling off of the generated E.M.F. It will be noted that this temperature range is higher than that of any previously utilized in such a system. The yttria remains inert to the sodium at the temperatures of interest and corrosion is almost nonexistent. For example, a cell running at 450° C. and 1000 hours showed no evidence of corrosion.

What is claimed is:

1. A solid electrolyte electrochemical cell wherein the solid electrolyte consists essentially of yttria.

2. A solid electrolyte electrochemical cell as in claim 1 wherein one of the electrodes comprises oxygen dissolved in sodium.

3. A solid electrolyte electrochemical cell as in claim 2 wherein the other electrode consists essentially of sodium and sodium oxide being saturated with oxygen.

4. A solid electrolyte electrochemical cell as in claim 1 wherein the solid electrolyte consists of yttria.

5. A solid electrolyte electrochemical cell as in claim 4 wherein one of the electrodes comprises oxygen dissolved in sodium.

6. A solid electrolyte electrochemical cell as in claim 5 wherein the other electrode consists essentially of sodium and sodium oxide being saturated with oxygen.

No references cited.

WINSTON A. DOUGLAS, *Primary Examiner.*

ALLEN B. CURTIS, *Examiner.*

D. L. WALTON, *Assistant Examiner.*